L. KEESER.
HAY TURNING MACHINE OF THE DRUM TYPE.
APPLICATION FILED JULY 31, 1909.
960,950.
Patented June 7, 1910.
2 SHEETS—SHEET 1.
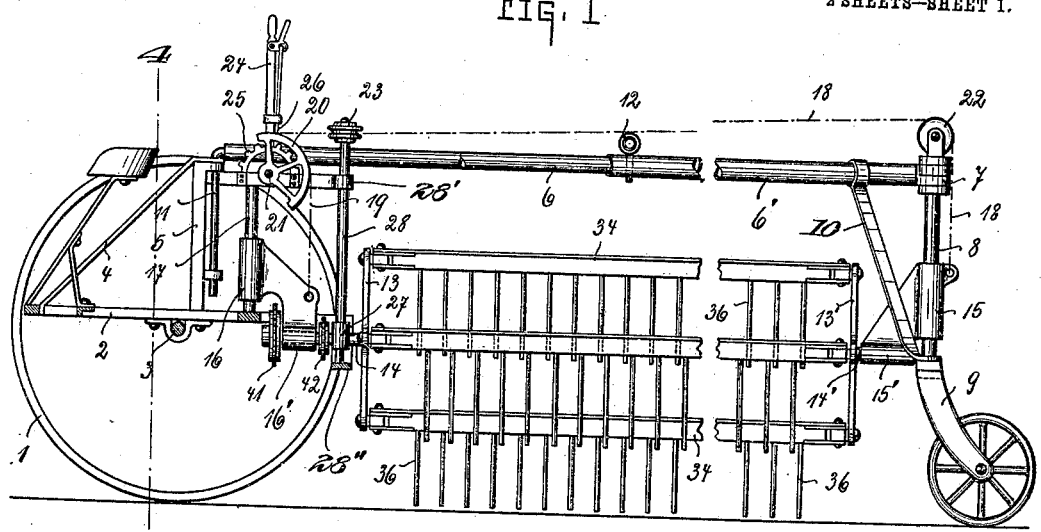
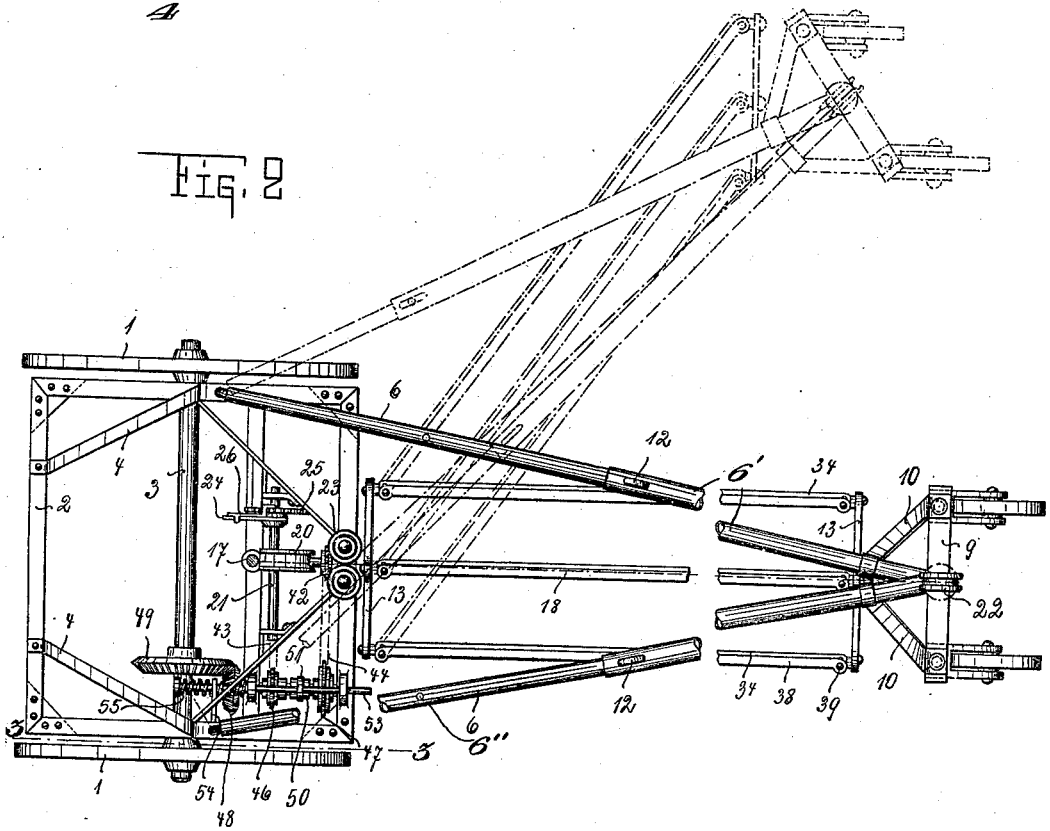

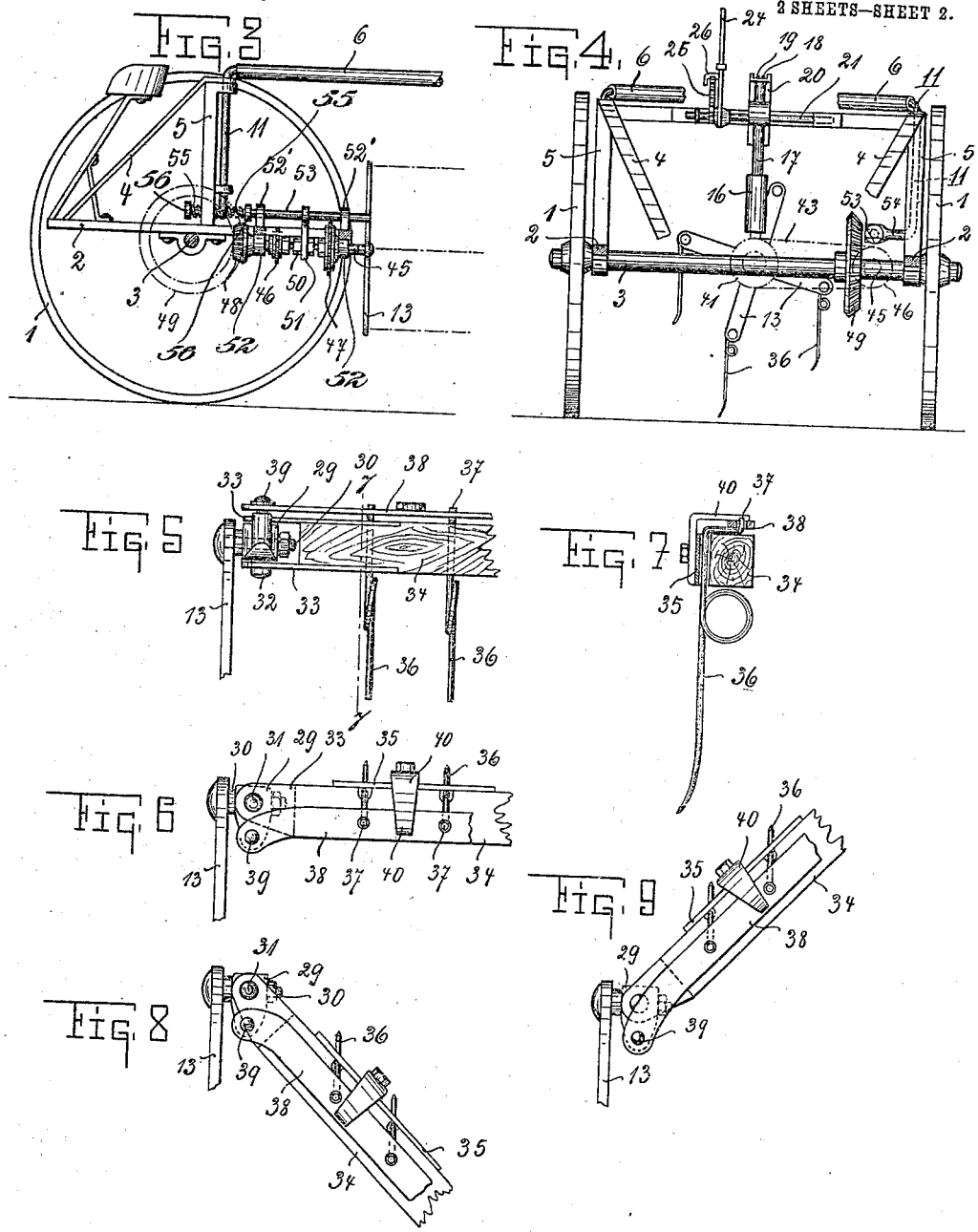

UNITED STATES PATENT OFFICE.

LEONHARD KEESER, OF SIMMELSDORF, NEAR SCHNAITTACH, GERMANY.

HAY-TURNING MACHINE OF THE DRUM TYPE.

960,950.  Specification of Letters Patent.  Patented June 7, 1910.

Application filed July 31, 1909. Serial No. 510,674.

*To all whom it may concern:*

Be it known that I, LEONHARD KEESER, whose post-office address is Simmelsdorf, near Schnaittach, Bavaria, Germany, have invented certain new and useful Improvements in and Relating to Hay-Turning Machines of the Drum Type; and I do hereby declare the following to be a full, clear, and exact description of the invention, such as will enable others skilled in the art to which it appertains to make and use the same.

This invention relates to an improved agricultural apparatus designed and adapted for use as a hay rake or tedder.

In the most improved embodiment of the invention front and rear, or trailing, trucks are provided and between said trucks is disposed a rotary carrier for the teeth of the rake to which motion is imparted from the supporting wheels of the apparatus.

One of the features of my invention consists in means for angularly disposing the training or rear truck, with respect to the longitudinal axis or line of travel of the front truck in such a manner, as to dispose and operate the teeth of the rake rearwardly and laterally, to one side or the other, of said front truck.

A further novel feature consists in an improved transmission whereby the rake teeth are operated at a rate of speed suitable for the purposes of a hay rake or a tedder, and wherein the teeth of the rake are thrown out of driven relation when in a transporting or non-operating position.

A further feature of novelty consists in pivotally mounting the teeth in the rake and in providing means for altering the position of the teeth, automatically, in accordance with the lateral adjustment of the rear or trailing trucks.

Other features of novelty will be more fully described in connection with the accompanying drawings and will be more particularly pointed out in and by the appended claims.

In the drawings:—Figure 1 is a view in side elevation of an apparatus embodying the main features of my invention. Fig. 2 is a plan view thereof showing one adjustment in dotted lines. Fig. 3 is a sectional view on line 3—3 of Fig. 2. Fig. 4 is a sectional view on line 4—4 of Fig. 1. Fig. 5 is a fragmentary side elevation showing the connection between one of the teeth carrying bars in the rake and a portion of one of the heads or spiders on which the bars is mounted. Fig. 6 is a plan view thereof. Fig. 7 is a sectional view on line 7—7 of Fig. 5. Fig. 8 is a view similar to Fig. 6 showing one of the bars adjusted for turning or tedding hay. Fig. 9 is a view similar to Fig. 6 showing one of the bars in a position for raking the hay.

Like numerals of reference designate similar parts throughout the different figures of the drawings.

Referring to the specific embodiment shown, 1 designates the wheels of a forward truck which includes a frame 2 mounted upon an axle 3, of said wheels. The frame 2 includes uprights 5 provided with bearings in which pivot members 11 of truck connecting rods are journaled. Advisedly the uprights 5 may be braced by stays 4.

A rear or trailing truck 9 is provided with caster wheels and carries an upright pivot rod 8. Connecting means is provided between the front and trailing trucks and as shown said means consists of telescoping pipes or tubes 6 and 6'. The pipes 6 are reduced in size with respect to the pipes 6' to fit therein and connecting means, which may be in the form of pins 12, serve to rigidly secure the pipes 6 and 6' in fixed relation after adjustment thereof. The pipes 6 are secured to the pivot rods 11 at their front ends and the rear ends of the pipes 6' are provided with eyes 7 which are mounted upon the upright pivot rod 8. Braces 10 are advisedly connected to the pipes 6' and to the truck 9 to hold the latter in fixed relation with respect to the former.

As shown in Fig. 2 the truck 9 may be angularly or laterally disposed or adjusted with respect to the front truck to cause the teeth of the rake to operate through a swath of any practical breadth. In adjusting the rear or trailing truck 9 from the position shown in full lines in Fig. 2, to the position shown in dotted lines therein, the pins 12 are first removed to permit the connecting pipes 6 and 6' to assume positions relative to each other in accordance with the adjustment of the truck 9. After the truck 9 has been adjusted the pins 12 are inserted through registering openings 6" and the truck 9 is thereby locked in the lateral position shown in dotted lines in Fig. 2. A journal bearing rod 17 is mounted upon the truck 2 and on said bearing rod is slidably mounted a bearing member having a bearing 16 slidable on said rod and an angularly or horizontally disposed bearing 16′ suspended below. A similarly formed member is provided for the rear truck having a bearing portion 15 slidably mounted on the pivot rod 8 and an angularly or horizontally disposed bearing member 15′ in horizontal alinement with the bearing member 16′, when the truck 9 is in the position shown in full lines in Fig. 2. The bearing portions 16′ and 15′ are designed to receive stud shafts 14 and 14′ of heads or spiders 13 and 13′ respectively. Each of the heads or spiders 13 13′ is provided with four arms arranged or spaced 90° from each other and on the outer ends of said spider bars are mounted the rake teeth carrying bars 34.

As shown in Figs. 5 to 9 inclusive, the bars 34 are provided with bifurcated ends which are formed by bars or extensions 33 secured to said bars 34. Said extensions 33 are pivotally mounted to trunnions 31 and 32 of pivot locks 29. The pivot locks 29 are secured to the ends of the spider 13 by pivots 30 which extend or lie at right angles to and intersect the axes of the pivots 31 and 32, as clearly shown in Fig. 6. The pivot locks 29 are provided with extensions carrying pivots 39 which are disposed eccentrically with respect to the pivots 31 and 32. The bars 34 are provided with bearing plates 35 apertured to receive the shanks of rake teeth 36 the upper ends of which are cranked, as at 37, to engage openings in positioning bars 38. The positioning bars 38 are connected to pivots 39 as shown in Fig. 6. The crank ends 37 serve to hold the bars 38 in parallel relation with the bars 34 and guides 40 serve to hold the bars 39 in engagement with the crank ends 37, of the rakes 36, to prevent disengagement therefrom. By means of this construction the necessity of employing fastening devices to secure the bars 38 to the crank pins 37 is obviated. It will be readily seen that by means of the eccentric mounting or connection of the bars 38 the teeth of the rake will always be maintained in parallel relation with the heads 13 and 13′. When the truck 9 is adjusted to cause the bars 34 to assume the position shown in Fig. 8 which is the tedding adjustment, the teeth 36 will be swung accordingly and in parallel relation with the heads 13. The same is true with respect to Fig. 9 wherein the truck 9 is adjusted to cause the teeth to act as a rake, the same being parallel with the heads 13.

Means is provided for raising and lowering the teeth 36 and their supporting parts to dispose the teeth 36 at the required elevation from the ground.

As shown a cable or chain 18 is secured to the bearing portion 15 and is trained about a pulley 22, mounted on the upper end of the pivot post or rod 8. Said cable or chain extends between pulleys 23 and is connected with a segment 20. The cable or chain 19 is connected to the bearing portion 16 and also to the segment 20. The segment 20 is mounted upon a shaft 21 on which a lever 24 is secured. The lever 24 is provided with the usual hand operated pawl 26, adapted for engagement with a toothed segment 25. From the foregoing it will be clear that as the lever 24 is adjusted in one position or the other upon the toothed segment 25 the teeth and the carrying frame therefor will be elevated or lowered accordingly.

A rod 28 extends through a fitting 27 through which the stud shaft 14 passes. Said rod 28 is journaled at 28′ and 28″ and serves to prevent rotation of the bearing structure 16 and 16′ about the rod 7. Irrespective of the position to which the trailing truck 9 is adjusted the said shaft 14 and the head 13 will always occupy the position shown in Figs. 1 and 2 with respect to the longitudinal axis of the forward truck.

The bars 34 and heads 13 and 13′ may be considered or termed a tooth carrying rotary frame and in order to impart rotary movement to this frame and cause the teeth to act in the capacity of a rake or tedder transmission mechanism is employed which may be of the following construction.

A relatively small sprocket wheel 42 is mounted upon the stud shaft 14, at one side of the bearing portion 16′. Upon a short shaft 45, mounted on the frame 2, in bearings 52 in parallel relation to the stud shaft 14, is loosely mounted a sprocket wheel 47 which is somewhat larger in diameter than the sprocket wheel 42. A sprocket wheel 41 somewhat larger than the sprocket wheel 42, is rigidly mounted on the stud shaft 14 and a sprocket wheel 46, somewhat reduced with respect to the sprocket wheel 47 is loosely mounted on the shaft 45. A sprocket chain 44 is trained about the sprocket wheels 42 and 47 and a sprocket chain 43 is trained about the sprocket wheels 41 and 46. A clutch 51, non-rotatively mounted on the shaft 45, is arranged for alternate engagement with the hubs of the sprocket wheels 46 and 47 to operatively connect either or disconnect both thereof with or from the shaft 45. A bevel gear 48 is mounted on the shaft 45 and meshes with a bevel gear 49 on the axle 3. The pivot rod 11, nearest or at the left side of the forward truck is provided with an extension 54 which engages a shifting rod 53 slidably mounted in bearings 52′. The rod 53 is provided with a fork 51 engaging the clutch 50 to shift the same into and out of engagement with the hubs of the wheels 46 and 47. Springs 55 are interposed between the extensions 54 and collars 56 so as to permit movement of the extensions 54 beyond positions in reverse directions necessary to engage the clutch 50.

From the foregoing it will be seen that when the truck 9 is shifted in the position shown in Fig. 2 in dotted lines the clutch 50 will throw in the small sprocket wheel 46 and the tooth carrying frame will be rotated relatively slowly. Furthermore it will be seen that this throw in of the clutch is automatic. When the truck 9 is in the position shown in full lines in Fig. 2 the extension 54 will cause the clutch to occupy an intermediate position and both the wheels 46 and 47 will be out of driven relation with the shaft 45. When the truck 9 is swung to the left of the front truck the clutch 50 will engage the wheel 47 and this will result in a relatively rapid rotation of the tooth carrying frame. The position to the right is that which will be occupied when the apparatus is employed as a rake, and to the left is that in which the apparatus will be employed as a tedder. The intermediate position shown in full lines is that in which the apparatus will be adjusted while being transported from place to place.

I claim:—

1. A tedder and rake comprising in combination, a forward truck, a trailing truck, a tooth carrying frame mounted on and between said trucks, and extensible means for holding said trailing truck in an angular position with respect to said forward truck.

2. A tedder and rake comprising in combination, a forward truck, a trailing truck, a tooth carrying frame mounted on and between said trucks, and extensible means for holding said trailing truck in a position angular to or in alinement with the longitudinal axis of the forward truck.

3. A combined tedder and rake comprising in combination, a forward truck, a trailing truck, a tooth carrying frame rotatively mounted on and between said trucks, mechanism for transmitting rotary movement to said frame, and extensible means for holding said trailing truck in an angular position with respect to said forward truck.

4. A combined tedder and rake comprising in combination, a forward truck, a trailing truck, a tooth carrying frame rotatively mounted on and between said trucks, means for holding said trailing truck in alinement with or in positions angular to said forward truck, and mechanism controlled by said means for throwing said frame into operation when in an angular position and out of operation when in an alined position with respect to said forward truck.

5. A combined tedder and rake comprising in combination, a forward truck, a trailing truck, a tooth carrying frame rotatively mounted and between said trucks, means for holding said trailing truck in alinement with or in a position angular to the longitudinal axis of said forward truck, and mechanism controlled by said means for transmitting relatively slow rotation to said frame when in one angular position and relatively rapid rotation thereto when in another position and throwing said frame out of operation when in an alined position with respect to said truck.

6. A combined tedder and rake comprising in combination, a forward truck, a trailing truck, a tooth carrying frame mounted on and between said trucks, and telescoping means for locking said trailing truck in alined or angular position with respect to said forward truck.

7. A combined tedder and rake comprising in combination, a forward truck, a trailing truck, a tooth carrying frame mounted on and between said trucks, means for locking said trailing truck in alined or angular position with respect to the longitudinal axis of said forward truck, and means for lowering and elevating said frame.

8. A combined tedder and rake comprising in combination, a forward truck, a trailing truck, means for locking said trailing truck in alined and at angular position with respect to the longitudinal axis of said forward truck, and a tooth carrying frame mounted on and between said trucks and comprising heads rotatively mounted with their axes coinciding with the longitudinal axes of said trucks when in their alined position, and toothed carrying bars pivotally mounted on said heads.

9. A combined tedder and rake comprising in combination, a forward truck, a trailing truck, a toothed carrying frame mounted on and between said trucks, said frame comprising a head at each end mounted respectively on said forward and trailing trucks, bars pivotally connected with said heads, teeth on said bars, means connected with said teeth for maintaining the same parallel with said heads, and means for locking said trailing trucks in alinement with or in positions angular to said forward truck.

10. A tedder and rake comprising in combination, a forward truck, a trailing truck, raking means carried between said trucks, pivoted members on one of said trucks, elements extending from said members to the other of said trucks, and locking means for said elements for holding said trailing truck in an angular position with respect to said forward truck.

11. A tedder and rake comprising in combination, a forward truck, a trailing truck, raking means carried between said trucks, and means including a plurality of elements extending from one truck to the other and locking devices for said elements for holding said trailing truck in an angular position with respect to said forward truck.

12. A tedder and rake comprising in combination, a forward truck, a trailing truck, raking means carried between said trucks, and devices connecting said trucks and spaced apart on one truck and converging together on the other truck, for locking said trailing truck in an angular position with respect to said forward truck.

13. A tedder and rake comprising in combination, a forward truck, a trailing truck, raking members carried by said trucks, mechanism transmitting motion to said members, and means controlling said mechanism and serving to lock said trailing truck in different angular positions with respect to said forward truck.

14. A tedder and rake comprising in combination, a forward truck, a trailing truck, raking members carried by said trucks, mechanism transmitting motion to said members, and means controlling said mechanism and serving to lock said trailing truck in alinement with said forward truck and in different angular positions with respect to said forward truck.

15. A tedder and rake comprising in combination, a forward truck, a trailing truck, raking members carried by said trucks, mechanism for transmitting motion to said members, and means for locking said trailing truck in different angular positions with respect to said forward truck and serving to control said mechanism to regulate the speed of said members in accordance with the position in which said trailing truck is locked.

16. A tedder and rake comprising in combination, a forward truck, a trailing truck, raking members carried by said trucks, mechanism transmitting motion to said members, and means for locking said trailing truck in alinement with or in different angular positions with respect to said forward truck, said means coöperating with said mechanism to render said members inoperative when said trailing truck is in an alined position and to operate said members at different rates of speed when said trailing truck is in different angular positions with respect to said forward truck.

17. A tedder and rake comprising in combination, a forward truck, a trailing truck, raking members carried by said trucks, and formed to act as a rake when the trailing truck is in one angular position with respect to said forward truck and as a tedder when the trailing truck is in another position, and means for locking said trailing truck in angular positions with respect to said forward truck.

18. A tedder and rake comprising in combination, a forward truck, a trailing truck, raking members carried by said trucks, and formed to act as a rake when the trailing truck is in one angular position with respect to said forward truck and as a tedder when the trailing truck is in another position with respect to said forward truck, and means for imparting a relatively slow movement to said raking members when the same are in a rake position and a relatively rapid movement to said members when the same are in a tedder position.

19. A tedder and rake comprising in combination, a forward truck, a trailing truck, raking members carried by said trucks and formed to act as a rake when the trailing truck is in one angular position with respect to said forward truck and as a tedder when the trailing truck is in another angular position with respect to said forward truck, mechanism for transmitting movement to said members, and means for locking said trailing truck in a position to cause said members to act as a rake or as a tedder, said means coöperating with said mechanism to cause the same to impart a relatively slow movement to said members when in a rake position and a relatively rapid movement of said members when the same are in a tedder position.

20. A tedder and rake comprising in combination, a forward truck, a trailing truck adapted to occupy alined or angular positions with respect to said forward truck, a plurality of raking members supported between said trucks, and means for maintaining said members at a predetermined angle with respect to the line of travel of said forward truck irrespective of the position of said trailing truck.

In testimony whereof I affix my signature in presence of two witnesses.

LEONHARD KEESER.

Witnesses:
MAX FLEUCIDER,
ELISABETH HELLMUTH.